(12) United States Patent
Artuso et al.

(10) Patent No.: US 11,039,294 B2
(45) Date of Patent: Jun. 15, 2021

(54) NON-THROTTLING ON EMERGENCY CELL SITES IN CELLULAR SYSTEMS

(71) Applicant: T-Mobile USA, Inc., Bellevue, WA (US)

(72) Inventors: Daniel Artuso, Concord, CA (US); Brandon Drake, Bellevue, WA (US); James McFadden, San Francisco, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/443,977

(22) Filed: Jun. 18, 2019

(65) Prior Publication Data

US 2020/0404474 A1    Dec. 24, 2020

(51) Int. Cl.
*H04W 4/90* (2018.01)
(52) U.S. Cl.
CPC .................................... *H04W 4/90* (2018.02)
(58) Field of Classification Search
CPC ....................................................... H04W 4/90

USPC ............................................. 455/455, 404.1
See application file for complete search history.

(56) References Cited

U.S. PATENT DOCUMENTS

2014/0286168 A1* 9/2014 Amano .................... H04B 7/15
370/235
2018/0146359 A1* 5/2018 Pawar ................... H04W 4/029

* cited by examiner

*Primary Examiner* — Chuong A Ngo
(74) *Attorney, Agent, or Firm* — Loeb & Loeb, LLP

(57) ABSTRACT

A core network for a cellular system may maintain a dataset of one or more cell sites as being in an emergency zone. The dataset may be populated by local network operators in or near the emergency zone. The core network may consult the dataset prior to enforcing contractual terms for data rate throttling or re-prioritization to determine if the subscriber is in a designated emergency zone. If so, the core network may suspend the enforcement of data throttling or lowering priority so that subscribers in the emergency zone receive full access to the communication network. The dataset may include an expiration time or be on a timer so that the local network operators may be required to re-enroll the one or more cell sites as being in an emergency zone.

20 Claims, 4 Drawing Sheets

160

NON-THROTTLING ON EMERGENCY CELL SITES IN CELLULAR SYSTEMS

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Communication rates and/or data throttling on a cellular network are controlled at a central core of a network based on the subscriber's contractual service plan. The service plan is administered centrally, without regard to the location of the user device. For example, a user even if on an unlimited data plan may have their data rates or service priority reduced when the user has exceeded a predetermined data volume in a service period, such as a billing month.

SUMMARY

In an embodiment, prior to applying subscriber-specific contractual performance restrictions, a core network may consult a dataset listing cell sites that are designated as being in an emergency zone. All subscriber devices serviced by a listed cell site are operated without contract-specific limitations. For example, a subscriber device operating via a designated cell site that has reached its 4G data limit may continue to operate at 4G speeds even though throttling to 3G speeds would occur if the subscriber device were in a non-emergency zone.

While limits on throttling can be removed on a subscriber basis, this capability is only set at the core level based on contracts. The described system allows local network operations personnel to designate cell sites as being in an emergency area so that all subscriber devices connected through the designed cell site or cell sites are operated without performance limits. Should those subscriber devices return to areas where no emergency has been designated, those devices will return to normal operation at contractually defined performance levels.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Public safety radio networks, in particular private radio networks, provide first responders a mechanism for communication between both people and vehicles. However, in some cases these private networks have limitations affecting communication among people on scene in an emergency. In some cases, responding agencies may use different systems that cannot talk to each other. Other times, the geographic area may be larger than the coverage area of a particular private network such as in the case of a wildfire. In other cases, personal devices may be used when members of the public are part of an emergency response or a first responder may have to resort to a personal device based on coverage or battery conditions of private network equipment. In cases where emergency communication relies on public networks it may be essential that those communications are not impeded.

A recent example illustrates. First responders and members of the public in a wildfire zone were using personal subscriber devices to communicate with members of the public, members of their own response team, and members of other response teams. However, many of these people quickly reached high speed data limits and found their communications throttled or deprioritized causing essential communication to be delayed or lost. The service provider was hampered from responding in a timely manner to requests to restore communication because, in part, each subscriber required separate authorization to upgrade contractual terms for a higher service plan. Restoration of full service was further hampered by the need for such changes to be implemented at a network-level location, far from the scene of the emergency.

In accordance with the current disclosure, public communication network may allow local network operators to designate a cell site, or a group of cell sites, as being in an emergency zone. Once a cell site is so designated, a policy service, such as Policy Control Enforcement Function (PCRF) of an LTE network architecture, removes throttling and/or de-prioritization for all subscriber devices operating via that cell site.

In order to minimize extension of emergency zone status beyond the emergency, an expiration time for the emergency designation may be part of the initial request or may be added automatically when the status for the cell site is set. While the designation may be repeated to extend the period, automatic expiration may be helpful because often local personnel are distracted by local needs immediately following an emergency such as a wildfire and may not remember to return a cell site to normal operation once the situation is under control.

Figure 1:
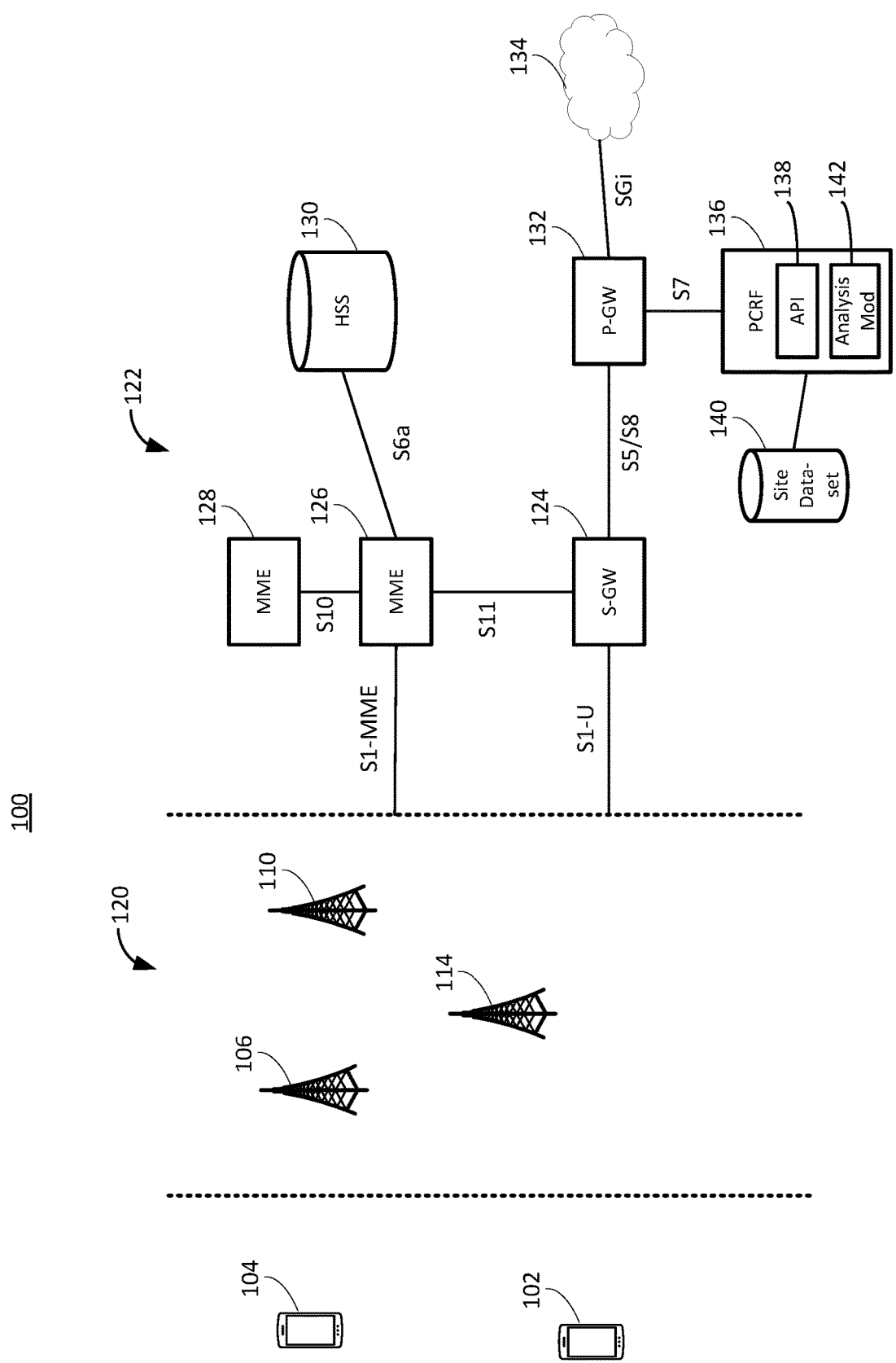
FIG. 1 is a system illustration of cellular communication system in accordance with the current disclosure.

FIG. 1 is a block diagram illustrating a simplified and exemplary cellular communication system 100. The system 100 shown in FIG. 1 is loosely based on a 4G LTE system but the techniques described in this document apply to any generation system, including 5G or other small cell implementations. The system 100 may include a number of subscriber devices 102, 104. These subscriber devices may be smartphones but may also be tablets, laptops, vehicles, and Internet of Things devices, including but not limited to, appliances, home control and security systems, or commercial and industrial monitoring systems, to name a few.

An access network 120 may include various cell sites 106, 110, 114 each supporting a cell site of radio frequency coverage, referred to in 4G terminology as an evolved base station (eNodeB or eNB). Each cell site 106, 110, 114 may include one or more antennas, transmitters, receivers, and controller (not depicted). Each cell site can handle a plurality of different subscribers devices using directional antennas and often different frequencies.

Managing communication between subscriber devices and between a subscriber device and an external data networks (the outside world) 134, is a core network 122, called in the 4G LTE example, the evolved packet core (EPC). The core network 122 illustrated here is greatly simplified for the sake of clarity. A serving gateway 124 may act as a router between cell sites 106, 110, 114 and the rest of traffic-oriented components. Mobility management entities (MMEs) 126, 128 manage signaling to the base stations including call set up and handoffs. A home subscriber server (HSS) 130 may be a central database that contains information about all the subscribers to the operator's communication system 100. A packet data gateway (P-GW) 132 handles communication between subscriber devices 102, 104 and the outside world 134.

A policy server 136, known in the 4G example as a policy control and charging rules function (PCRF) is responsible for control decision-making and flow-based charging. In an embodiment, the policy server 136 instructs the P-GW 132 to enforce the PCRF's decisions via a policy control enforcement function (not depicted) which resides in the P-GW 132. In the illustrated embodiment, an emergency cell site dataset 140 may be coupled to the policy server 136. The policy server 136 may include an application program interface (API) 138 that supports field updates to the emergency cell site dataset 140. The API 138 is discussed in more detail below.

An analysis module 142 may be included in the policy service 136. The analysis module 142 may perform the actual comparison of cell sites associated with incoming service requests to the cell sites listed in the emergency cell site dataset.

Figure 2:
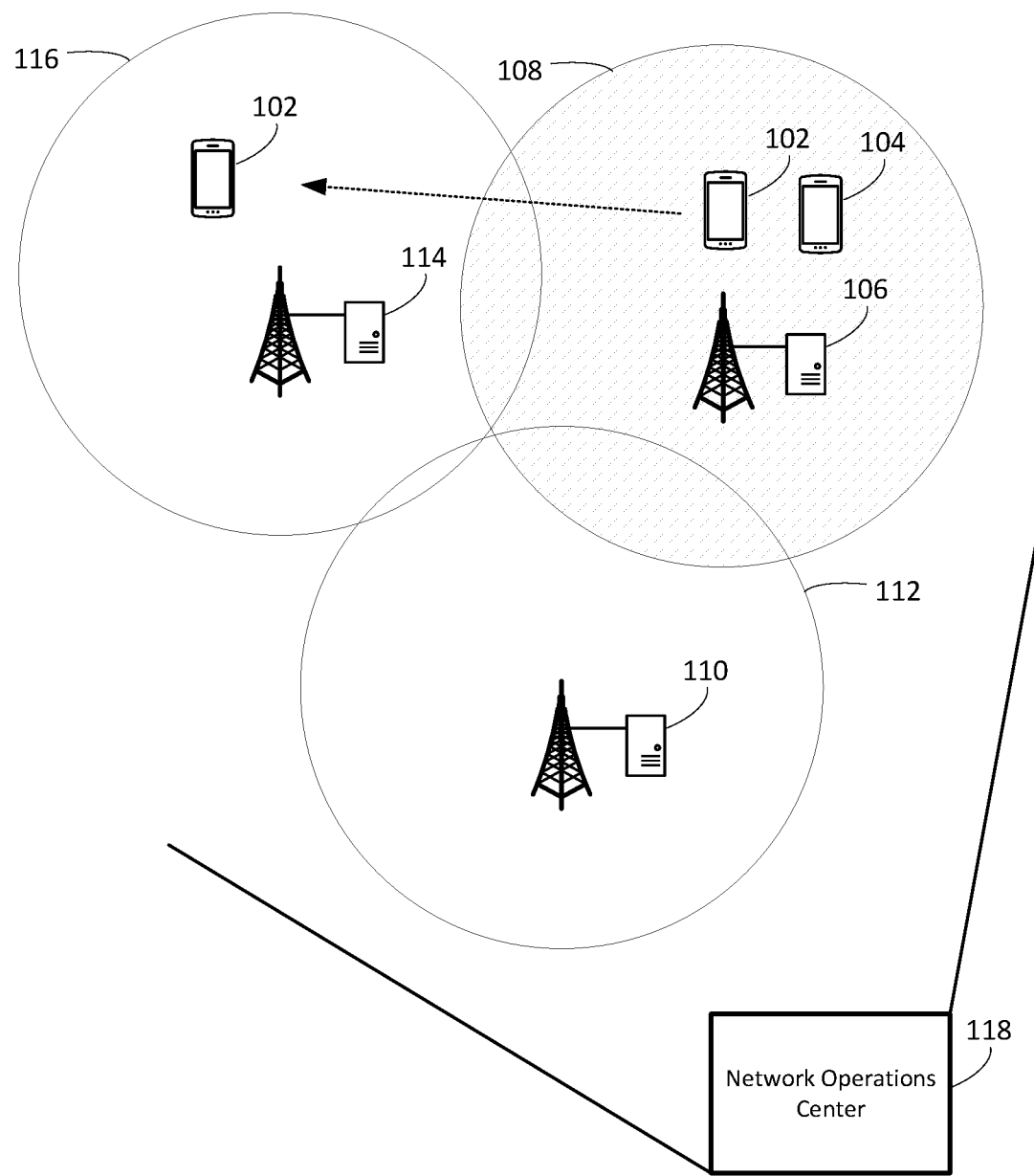
FIG. 2 illustrates in more detail a portion of the cellular communication system of claim 1.

Further detail of the access network 120 may be illustrated in FIG. 2. The cell sites 106, 110, 114 support coverage areas 108, 112, and 116 respectively. A network operations center 118 may provide local operations personnel with the ability to monitor and service cell sites in a certain geographic area. As illustrated in FIG. 2, the cell site 106 having coverage area 108 may be designated as an emergency area by way of listing the cell site 106 in the emergency cell site dataset 140.

In operation, a cell site coverage area 108 may be determined as covering a location that is experiencing an emergency. A designated person, such as a senior person in a first-responding service, may contact the network operations center 118 and request that a certain area be designated as an emergency zone. Personnel at the network operations center 118 may determine that the coverage area 108 corresponds to the requested geographic area and begin the process for requesting the change. The network operations center 118 may access the policy server 136 via the API 138 and enter the necessary data for adding the cell site to the emergency cell site dataset 140. In an embodiment, this capability may be added to an existing network function via the S1 interface. The API 138 may allow entry of as little data such as an identifier of the cell site 106. In other embodiments, the data may include an expiration date. The data may also include a contact name at the network operations center, contact information for the requesting party, and/or the nature of the emergency. In an embodiment, the change may be automatically entered so that delays associated with human review of requests may be avoided. As discussed above, an expiration time, if used, may be included with the request or may be added automatically at the policy service 136.

Once the cell site 106 has been added to the emergency cell site dataset 140, communication by any subscriber device 102, 104 via that cell site 106 will be excluded from contractual-related limitations to service including throttling related to cumulative data volume, communication bandwidth or selective de-prioritization of communication content. As noted above, an unexpired listing in the emergency cell site dataset 140 essentially causes the policy service 136 to view subscriber devices 102, 104 using a cell site point of view rather than an individual subscriber device point of view. As shown in FIG. 2, if a subscriber device 102 leaves a listed coverage area 108 and moves into another coverage area 116 not listed in the emergency cell site dataset 140, its operational context for bandwidth and priority will revert to its contractually defined level.

In an embodiment, the local network operations personnel may not directly access the emergency cell site dataset 140 in the core network 122 but may set a parameter at the local cell site 106, at the access level 120, that is then forwarded to the emergency cell site dataset 140. For example, local personnel may not be granted access to settings in the core network 122, but may be able to make changes to parameters at the cell site level. In this way, local operations personnel can be responsive to quickly changing situations by being able to, in one embodiment, set a flag and/or enter an expiration date at the cell site level and have that information reflected at the core network 122.

In some embodiments, the policy service 136 may not increase service levels beyond those of a subscriber's original contract when in communication with a designated cell site. That is, the policy service 136 may simply refrain from actively reducing performance for a subscriber device covered by a designated cell site 106 rather than actively increasing performance levels for all subscriber devices covered by a designated cell site 106.

For example, a subscriber with a 5 Megabits per second (Mbps) data rate may not automatically be increased to a 10 Mbps data rate. However, that subscriber device would not be reduced to, for example, a 500 Kilobits per second data rate if the device's high speed data volume had been exceeded while or before being in the designated cell site 106. However, in some embodiments, the policy service 136 may increase all data rates to the maximum that can be sustained at the cell site 106. The actual performance management is performed by the P-GW 132 or similar network function operating under the directive of the policy server 136.

A subscriber's original contract may cover all devices used by the subscriber. As is noted that in the prior art situation above where, for example, a first responder may resort to using his or her personal device in an emergency zone, service throttling would follow the person, not the device. Should the subscriber/first responder switch from a cell phone to a tablet that are both on the same contract, the throttling would continue. A system in accordance with the current disclosure does not apply contract-level limits to devices operating in a designated emergency site but rather allows communication without limitation to all devices independent of contractual status.

Figure 3:
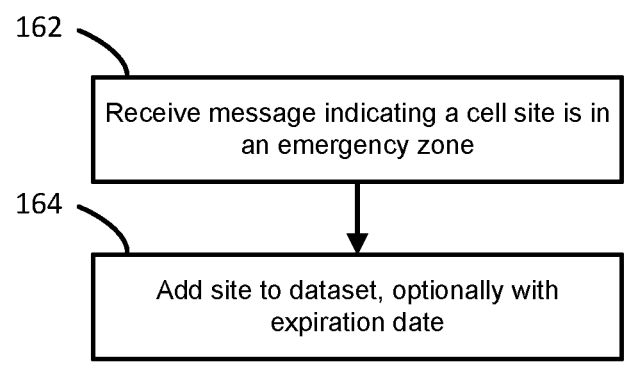
FIG. 3 is a flowchart of a method operating the cellular communication system of FIG. 1.

A method 160 of operating a core network supporting a cellular communication system may be illustrated in the flowchart of FIG. 3. At block 162, a data message may be received at a core network function, such as the policy service 136. The data message may be a request to add a cell site to an emergency cell site dataset. To facilitate messaging with the policy service 136, an API 138 may be published which allows external entities, such as a network operations center 118, to prepare and submit these messages.

At block 164, after any required authentication and authorization steps, the cell site, such as cell site 106 of FIG. 2, may be added to the emergency cell site dataset 140. The data message may include an expiration time such as a specific date/time or a period of time to expiration, such as 36 hours. In another embodiment, the policy service 136 may add an expiration time automatically, while in still other embodiments, no expiration time may be set. Once added to the emergency cell site dataset 140, the system 100 may wait for incoming service requests from the designated cell site.

Figure 4:
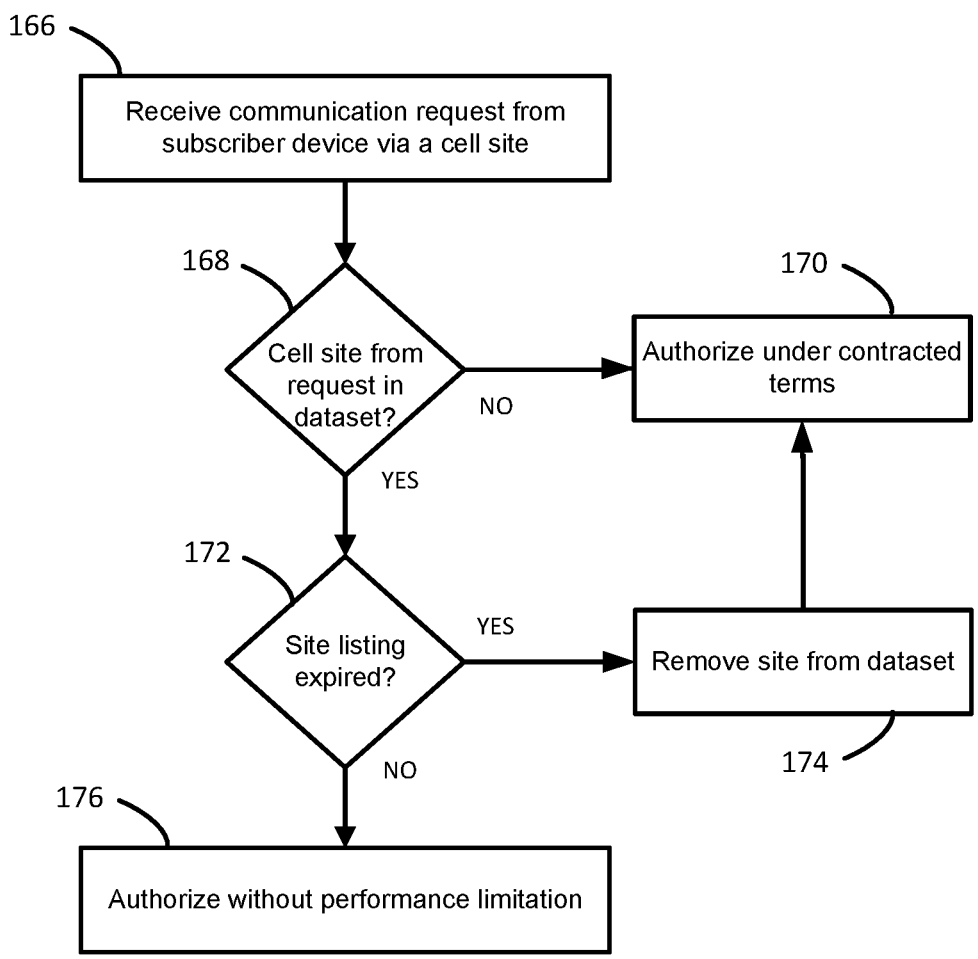
FIG. 4 is a flowchart of a continuation of the method of FIG. 3.

FIG. 4 is a flowchart of a method 165 depicted handling of traffic via a cell site, for example, cell site 106 using the system 100 in accordance with the current disclosure. At block 166, the policy service 136 may identify a cell site associated with a service request for a subscriber device 102. In an embodiment, the policy service 136 may be a PCRF of a 4G LTE network. In other network types, the policy service 136 may be another functional component of the system.

At block 168, the cell site 106 supporting the service request from the subscriber device 102 may be compared to an emergency cell site dataset 140. If the cell site is not in the emergency cell site dataset at block 168, execution may continue at block 170 where service is provided to the subscriber device 102 under existing contractual terms.

Responsive to the cell site 106 matching an entry in the emergency cell site dataset at block 168, execution may continue at block 172 where any optional expiration times for status of the cell site 106 may be checked. If the cell site 106 is expired, execution may continue at block 174, where the cell site 106 may be removed from the emergency cell site dataset. After which, execution may continue from block 174 to block 170.

If, at block 172 the cell site listing in the emergency cell site dataset 140 is not expired, execution may continue at block 176. There, the request for service for the subscriber device 102 may be approved and communication service provided without limitation to the subscriber device. As discussed above, providing service without limitation may be the subscriber's contracted amount before an limits are reached or may be service at the maximum rate supportable by the cell site 106. The service to the subscriber device 102 may include removing a subscriber device limit on data volume over a period of time and/or may remove the subscriber device limit on communication bandwidth.

At least one technical effect of the system is the change of system resource allocation from a subscriber account basis to a cell site basis. That is, the described system architecture adds an operational mode for supporting subscriber devices 102, 104 based solely on those devices being serviced by a designated cell site. A further technical effect is an API allowing local personnel to effect changes at the local level.

Both first responders and the public at large benefit from the operation of the cellular communication system 100 as described. At a time when voice, data, and messaging traffic may be most beneficial to public safety, imposition of artificial limits based on contractual terms may be avoided. The cellular network providers may enjoy good public relations for the proactive steps taken to ensure this capability while avoiding the backlash of public opinion when such limits are imposed at critical times.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A core network supporting a cellular communication system comprising:
   a packet gateway for transmitting data packets;
   a policy service (PCRF) coupled to the packet gateway;
   a plurality of cellular cell sites coupled to the packet gateway; and
   an emergency cell site dataset that lists designated cell sites, wherein the PCRF is configured to instruct the packet gateway to provide communication service without limitation in the data packets or by subscriber plans to a subscriber device served by one of the designated cell sites active in the emergency cell site dataset.

2. The core network of claim 1, wherein the emergency cell site dataset includes an expiration indicator corresponding to each designated cell site, the expiration indicator that sets time to return a designated cell site to normal service operation.

3. The core network of claim 1, further comprising a real-time analysis module that compares a cell site serving a subscriber device to the emergency cell site dataset prior to an evaluation of contractual operating terms for the subscriber device.

4. The core network of claim 1, further comprising:
   an application program interface (API) that exposes methods for adding a cell site to the emergency cell site data set.

5. The core network of claim 1, further comprising an input server for adding a cell site to the emergency cell site data set.

6. The core network of claim 1, wherein the packet gateway provides communication service to the subscriber device without limitation by providing communication service without limit to communication bandwidth.

7. The core network of claim 6, wherein the packet gateway provides communication service to the subscriber device without limitation on cumulative data volume.

8. A method of operating a core network supporting a cellular communication system, the method comprising:
   identifying, at core network function, a cell site associated with a service request for transmitting data packets for a subscriber device;
   comparing, at the core network function, the cell site to an emergency cell site dataset; and
   responsive to the cell site matching an entry in the emergency cell site dataset, providing communication service without limitation in the data packets or by subscriber plans to the subscriber device.

9. The method of claim 8, further comprising receiving a data message that adds a cell site to the emergency cell site dataset.

10. The method of claim 9, wherein receiving the data message comprises receiving in the data message an expiration time, the expiration time setting a time to remove the cell site from the emergency cell site dataset.

11. The method of claim 9, further comprising auto setting an expiration time upon receipt of the data message, the expiration time setting a time to remove the cell site from the emergency cell site dataset.

12. The method of claim 9, further comprising publishing an API that exposes a method that generates the data message at a remote client.

13. The method of claim 8, wherein providing service without limitation comprises removing a subscriber-device limit on communication bandwidth.

14. The method of claim 8, further comprising updating an attribute of the cell site at the core network that adds the cell site to the emergency cell site dataset.

15. The method of claim 8, wherein providing service without limitation comprises removing a subscriber device limit on data volume over a period and removing the subscriber device limit on communication bandwidth.

16. The method of claim 8, wherein the core network function is a policy service (PCRF).

17. A method of operating a core network supporting a cellular communication system, the method comprising:

identifying, at a policy service function (PCRF), a cell site associated with a service request for transmitting data packets for a subscriber device;

comparing, at the PCRF, the cell site to an emergency cell site dataset; and responsive to the cell site matching an entry in the emergency cell site dataset, instructing a packet gateway to provide communication service without limitation, in the data packets or by subscriber plans, to the subscriber device.

18. The method of claim 17, further comprising:

receiving, at the PCRF from the cell site, a message indicating the cell site is to be added to the emergency cell site dataset.

19. The method of claim 18, further comprising:

setting, at the cell site by a local operator, a flag indicating the cell site is designated as being in an emergency zone; and sending the message to the PCRF indicating the cell site is to be added to the emergency cell site dataset.

20. The method of claim 17, wherein providing communication service without limitation comprises removing limits on both communication rate and data volume.

\* \* \* \* \*